Figure 4:
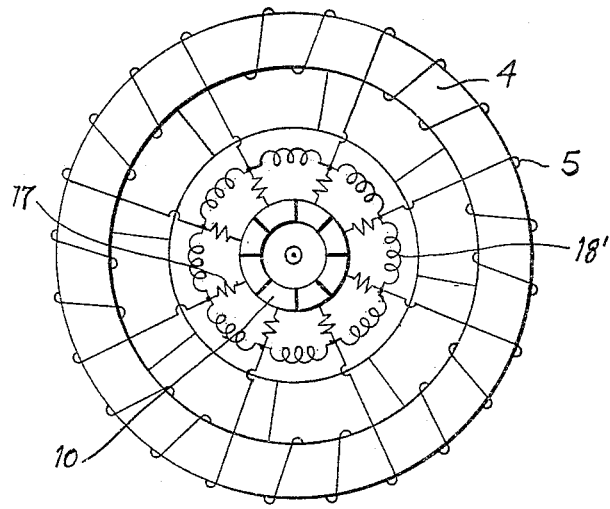

D. C. JACKSON.
DYNAMO ELECTRIC MACHINE.
APPLICATION FILED OCT. 23, 1905.

924,992.

Patented June 15, 1909.
2 SHEETS—SHEET 1.

Witnesses
George E. Higham.
Fred W. Koehn.

Inventor
Dugald C. Jackson
By Charles A. Brown
Attorney

D. C. JACKSON.
DYNAMO ELECTRIC MACHINE.
APPLICATION FILED OCT. 23, 1905.

924,992.

Patented June 15, 1909.
2 SHEETS—SHEET 2.

Witnesses
Genge C. Higham.
Fred W. Koehn.

Inventor
Dugald C. Jackson
By Charles A. Brown
Attorney

DUGALD C. JACKSON, OF MADISON, WISCONSIN.

DYNAMO-ELECTRIC MACHINE.

No. 924,992. Specification of Letters Patent. Patented June 15, 1909.

Original application filed January 11, 1904, Serial No. 188,485. Divided and this application filed October 23, 1905.
Serial No. 283,884.

*To all whom it may concern:*

Be it known that I, DUGALD C. JACKSON, citizen of the United States, residing at Madison, in the county of Dane and State of Wisconsin, have invented a certain new and useful Improvement in Dynamo-Electric Machines, of which the following is a full, clear, concise, and exact description, reference being had to the accompanying drawings, forming a part of this specification.

My invention relates to dynamo electric machines and is particularly adapted for use in conjunction with alternating current motors intended for the translation of pulsating or alternating currents.

My present application may be considered as a division of my application, Serial No. 188,485, filed January 11, 1904.

There are many reasons why single phase alternating current motors of adequate qualities would be of greater utility than the polyphase motors which are now commonly used in connection with alternating current power plants; and my invention relates to an armature which is particularly adapted for use with such single phase motors. It provides armatures for single phase alternating current motors which are particularly well adapted for use in the propulsion of electric vehicles. They are also well adapted for the general purposes of alternating current power motors, and are not confined to usefulness with single phase alternating current motors but may be used with polyphase motors.

An ordinary induction motor will operate as a single phase alternating current motor, but it suffers under the disadvantage that some means must be provided for starting and bringing it at least partially to full speed. On the other hand, series or shunt motors receiving current in the ordinary armature from an external source and so-called repulsion motors, in all of which the armatures are provided with suitable windings associated with a commutator, suffer from various disadvantages unless they are modified in some manner, such as I have disclosed in certain earlier but co-pending applications. My present invention is related to those which I have disclosed in co-pending applications, such as Serial No. 8202, filed Mar. 10, 1900, and Nos. 136,143 and 136,144, filed December 22, 1902; and it particularly concerns certain improvements in armature construction for alternating current dynamo electric machines having commutators. There is provided upon the armature a suitable winding connected with a commutator between appropriate bars of which are connected suitable conductors or resistances, and also interposed in the leads which join the armature coils with the said commutator bars are placed certain other resistances which serve the purpose of controlling the flow of current that ordinarily occurs in the progress of commutation whenever an armature coil is short-circuited by a brush bearing upon two adjacent commutator segments.

My invention will be readily understood by reference to the accompanying drawings in which—

Figure 1:
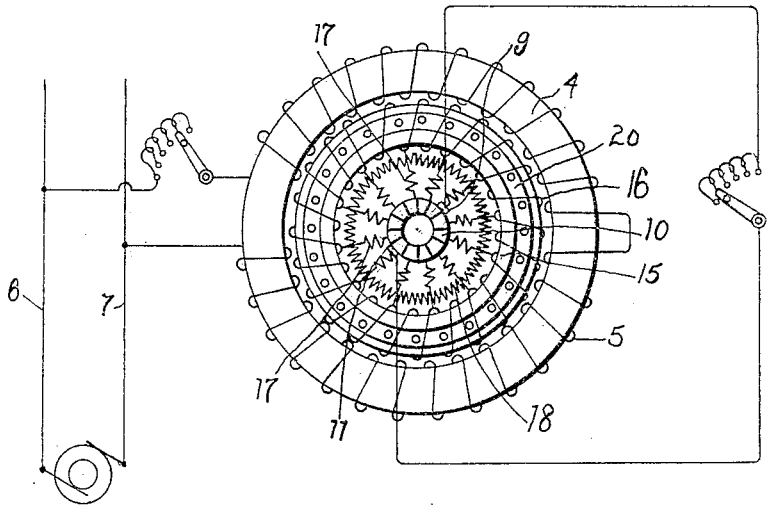
Figure 3:
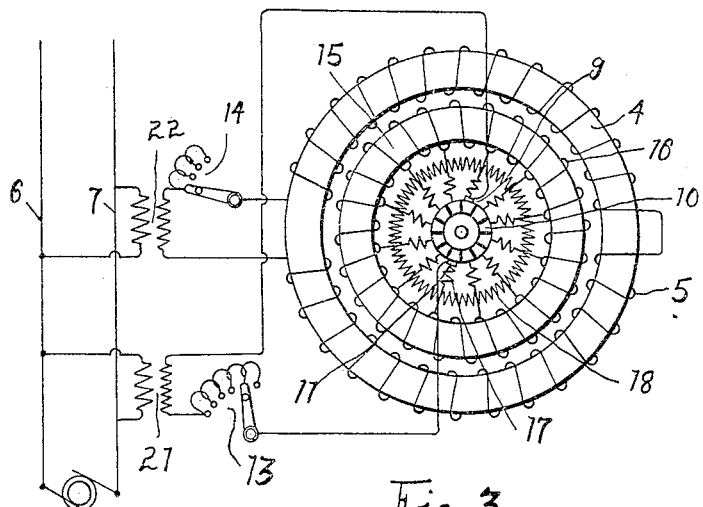
Figure 2:
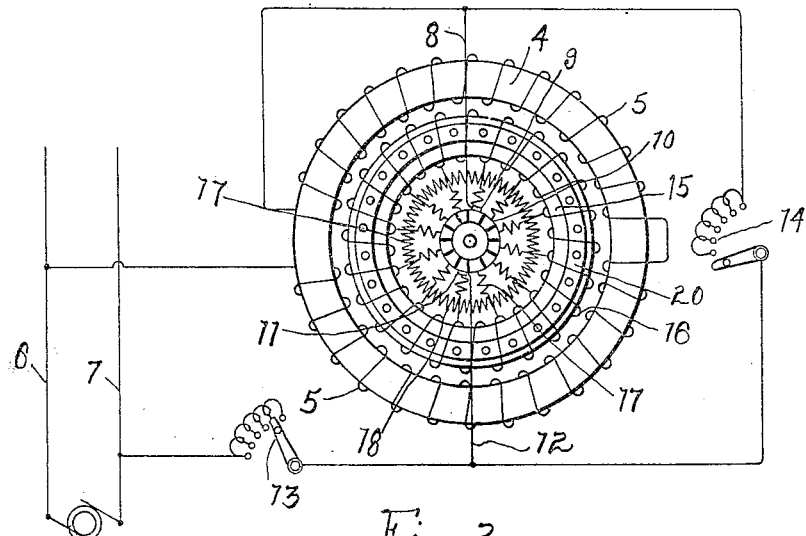

Figure 1 is a diagrammatic view showing the armature arranged in circuit connections as in a repulsion motor, so-called; Fig. 2 shows a modification, with the circuit connections arranged for a motor, in which the armature and field winding are connected in series relation; Fig. 3 shows a modification of a motor and the circuit connections therefor, in which the field and armature are connected in circuit as the equivalent of a shunt motor; Fig. 4 illustrates a modified armature arrangement.

In these figures I have diagrammatically shown a well known form of ring field magnet 4 provided with a field magnet winding 5 adapted to be supplied with alternating currents from the mains 6, 7.

The arrangement shown in Fig. 1 is similar to that of a repulsion motor in which the current may be traced from the main 6 through the field winding 5 back to the main 7. The brushes 9 and 11 riding upon the commutator 10 of the motor armature are electrically joined through a path which includes a rheostat or controller. The armature core 15 is provided with the Gramme ring winding 16, which is connected at intervals to the bars of the commutator 15 through the resistances 17, 17. The conductors or resistances 18 are connected as shown between leads which run from the armature winding to the commutator bars. The armature may, if desired, be provided, as shown, with an additional squirrel cage winding 20. The operation of such a motor as illustrated in Fig. 1 may be described as follows:

When the circuit is closed through the field winding, the armature will be caused to rotate on account of the induced current which flows through the armature windings and the circuit including the brushes, the brushes being displaced from the neutral point in the well known manner. As the armature increases in speed the squirrel cage winding (if one is provided) comes into play and assists in causing the rotation. The bridging conductors 18, 18 may be of rather high resistance, so as to cause the larger part of the current induced in the armature coils to flow through the brushes rather than through these commutator bridges. The extra resistances 17 serve to control the current flowing through the otherwise short-circuited armature coils at the time of commutation, thus serving to prevent injurious sparking. The regulation at the motor operating through the effect of the repulsion winding with the commutator is, within certain limits, similar to that of a series motor; that is, the torque increases with a decreasing speed, thereby producing a speed-torque curve which is particularly suitable for electric railway motors. The squirrel cage winding if it is used may be of rather high resistance, if it is desired to maintain a speed-torque characteristic approximating to that produced by the repulsion winding. The form of the speed-torque curve can be modified as desired by adjusting the resistances of the conductors 18 and of the squirrel cage winding, if one is used.

In Fig. 2 I have illustrated a modified arrangement in which the field and commutated armature windings are connected in series. The path of the current may be traced from the main 6 through the field winding 5 to conductor 8 which leads to the brush 9 riding upon the commutator 10 of the motor armature. The other brush 11 being connected by means of conductor 12 through the rheostat or controller 13 to the other supply main 7. In this drawing there is also shown a rheostat or controller 14 connected in a circuit from brush to brush and thus as a shunt to the armature, so that the proportion of current traversing the armature winding may be regulated and varied. The rheostats 13 and 14 may be used for controlling the speed of the motor. The armature shown in this figure is like that shown in Fig. 1.

Fig. 3 illustrates another modification of the connections in circuit in which the field and armature are connected in parallel relation through separate transformers 21 and 22 interposed between the mains 6 and 7 and the motor itself. These transformers are not essential to the structure, and the motor could be directly connected to the mains or a single transformer might be used feeding the two motor circuits in parallel. The squirrel cage winding is not shown in this drawing and the operation of the motor is wholly dependent upon the re-actions between the magnetism of the field magnet and the portion of the alternating current which flows through the armature winding by means of the brushes from the external circuit, plus the reactions caused by the currents induced by the field magnet in the closed circuits of the armature winding which are severally composed of portions of the winding and the corresponding resistance conductors 18. As in the other drawings, the resistances 17 serve to control the currents which would otherwise flow through the short-circuited armature coils at the time of commutation.

In Fig. 4 I have shown an open coil construction of armature which may be advantageously used for the same purpose, bridging resistances in this instance being shown as coils 18' having some self-induction. Such an armature as that shown in Fig. 4 may, of course, be provided with a separate squirrel cage winding if desired.

I have shown and described the resistances 18 as located on the winding side of the resistances 17 but this may be modified by placing the resistances 18 on the commutator side of the resistances 17, especially when the armature is to be used in a repulsion motor with the electrical connections similar to those illustrated in Fig. 1. This change in the relative positions of the resistances 18 with respect to the resistances 17, or adjusting the proportional values of either or both of these resistances 17 and 18, may be adopted to alter the speed-torque characteristic of the motor; and the most desirable form of the speed torque characteristic for any particular service may be thereby produced.

I have described my invention as applied to an electric motor but the same construction may, under suitable conditions, be applied to the armature of alternating current generators, as will be understood by those skilled in the art. I have shown the resistances 17 inserted in each of the leads through which an armature winding is put into connection with the commutator segments, but other arrangements may be used, as inserting these resistances in alternate leads; I have also shown the resistances 18 connected uniformly between adjacent leads from armature winding to commutator segments (whereby they bridge between adjacent commutator segments) but this is not essential to the invention and other arrangements may be used, as bridging these resistances respectively between any suitable portions of the armature windings; and other modifications of the construction may also be made. I therefore do not wish to limit myself to the precise embodiments herein set forth; but Having described my invention, I claim as new and desire to secure by Letters Patent, the following:

1. In a dynamo electric machine, the combination of an armature having a commutated winding, a commutator for said winding, conductors connecting said winding with said commutator, a resistance included serially in each of said conductors, and inductive coils bridged between adjacent conductors at a point between said other resistances and the armature winding.

2. In an electric motor, the combination with a field magnet, of a source of alternating current connected therewith, an armature carrying a suitable winding, a commutator connected by conductors at suitable intervals with said winding, resistances included in said conductors, and inductive resistances connected in bridge of said conductors at points between the resistances and the armature winding.

3. In a dynamo electric machine, the combination with an armature having an open coil commutated winding, of a commutator for said winding, conductors connecting said winding with said commutator, a resistance included serially in each of said conductors, and inductive resistances connected in bridge of said conductors at points between the resistances and the coils of the armature winding.

In witness whereof, I hereunto subscribe my name this twentieth day of October A. D., 1905.

DUGALD C. JACKSON.

Witnesses:
CHARLES J. SCHMIDT,
LEONARD W. NOVANDER.